May 29, 1934.   J. W. MOORE ET AL   1,960,750
GASKET CONSTRUCTION
Filed Oct. 17, 1929
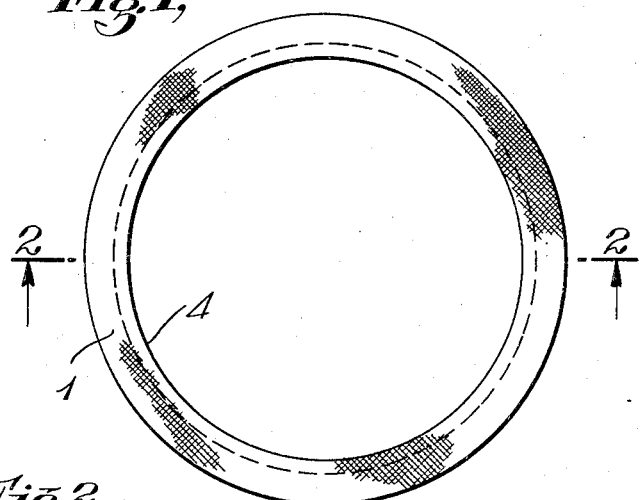
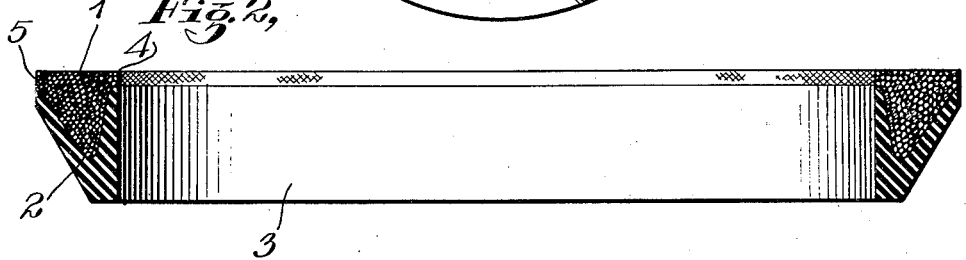
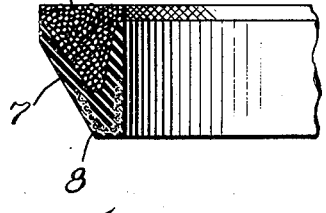   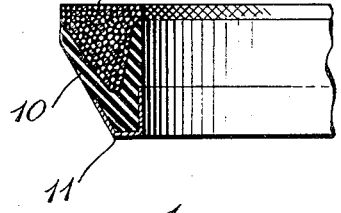
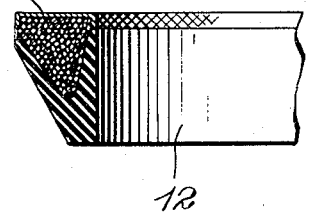   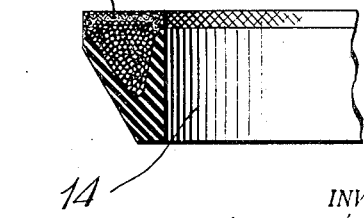
INVENTORS,
JAMES W. MOORE
VERNE C. FOSTER
BY Meyers & Jones
ATTORNEYS.

Patented May 29, 1934

1,960,750

UNITED STATES PATENT OFFICE 1,960,750

GASKET CONSTRUCTION

James W. Moore and Verne C. Foster, Birmingham, Ala., assignors to American Cast Iron Pipe Company, Birmingham, Ala., a corporation of Georgia Application October 17, 1929, Serial No. 400,273

3 Claims. (Cl. 288—1)

This invention is an improvement in gasket constructions, and more particularly in a gasket of the character used in coupling cast iron pipes, with gland packed type of joints, designed to carry fluids.

Gaskets used in joints of pipes conducting fluids, such as gas, water and the like, are exposed to different conditions, internally and externally, and a material suitable for use where it would contact with the fluid, is unsuitable for use where it is subjected to the action of the moisture of the air or soil.

One of the primary objects of the present invention is the provision of a composite gasket, adapted for use and suitable for the purpose, in all of the various conditions in which it may be used in forming pipe joints.

Another object is to provide a simple inexpensive form of gasket, of a shape and with the parts so arranged with respect to each other, that the action of the fluid supplements the action of the moisture in the soil or air to tighten the gasket.

In the drawing forming a part hereof:—

Fig. 1 is a top plan view of the improved gasket.

Fig. 2 is a section on the line 2—2 of Fig. 1.

Figs. 3, 4, 5, and 6 are sections through one side of the gasket, showing other embodiments.

The improved gasket is composed of rubber and fibrous material, such as jute, flax, hemp, or the like, the fibrous material being aggregated into a body, which is partially enclosed by the vulcanized rubber.

In the embodiment of the invention shown in Figs. 1 and 2, the fibrous material which may be braided or woven, or otherwise prepared, is aggregated into a body indicated at 1, having a shape substantially triangular in cross section, and otherwise shaped in accordance with the ends to be served by the gasket, that is, in the form of an annulus, or the like.

This body is embedded in a groove 2, in a trough shaped member 3 of rubber, the side walls of the trough, diverging at an acute angle as shown, and the body 1 is of a size such that it extends above and rests upon the top of each side wall, in the form of a ledge, as indicated at 4 and 5, respectively. Thus the top of the gasket is composed wholly of fibrous material, while the sides and bottom are of rubber, which is vulcanized, as above mentioned.

In the combination of vulcanized rubber and fibrous material, as above described, there is a marked advantage over the usual solid vulcanized rubber ring, such as is ordinarily employed in pipe joints, or in couplers of various types, and particularly in piping designed to conduct dehydrated gas.

Vulcanized rubber is especially suitable for use with dehydrated gas conducting pipes, when the rubber is under compression. It does not deteriorate if in contact with the gas and completely confined, but it may deteriorate when exposed to air, or to the action of the soil. While it is true that the amount of contact is limited by the contact of the gland, of necessity there must be clearances, and as the rubber tends to flow very much like water with the lapse of time, it is crumbled by the action of soil or air.

In the present construction, no rubber is exposed to the atmosphere or to the soil, all the exterior surface of the gasket so exposed, being of fibrous material. The moisture in the air or soil tends to swell the fibrous material, thereby creating a pressure which tends to hold the rubber firmly against the surfaces of the pipe socket and spigot end. This is because of the wedging action, the gasket as a whole being wedge-shaped, and the body of fibrous material being also wedge-shaped.

In Fig. 3, the gasket is of the same construction as in Fig. 2, consisting of the body 6 of fibrous material, and the rubber 7, but the rubber is provided with a duck tip 8, a strip of duck being imbedded in the rubber at the small end of the wedge. This strip as shown, extends across the bottom of the gasket, and in the side walls to substantially the bottom of the trough which receives the body 6 of fibrous material.

In Fig. 4, the gasket is composed of the body 9 of fibrous material, and the trough shaped member 10 of rubber. Instead of a duck tip, the gasket is provided with a metallic tip 11, of lead, tin, or any other suitable material. This tip is placed outside of the rubber, and is placed in about the same manner as the duck tip 8.

In Fig. 5, the gasket 12 is provided with a backing 13 of a suitable metal. This backing is placed at the outer surface of the gasket, and completely covers the body of fibrous material. In Fig. 6, the gasket 14 which is similar to the gasket shown in Fig. 2, has a backing 15 of duck, which is arranged in substantially the same position as the backing 13 of Fig. 5.

The combination of fibrous material and vulcanized rubber makes an all condition gasket for a pipe joint. Gas in the dry state, such as natural gas, dries out the fibrous material, thereby contracting it. The same character of gas, however, acts to distend or swell rubber, and the swelling action on the rubber is considerably greater than the shrinking action on the jute.'

With manufactured gas, which is a saturated gas, there is no particular tendency to contract the jute, but there is a tendency to swell the rubber. In water, there is a very definite tendency to swell the jute, but none to either contract or swell the rubber. It will be apparent that the improved gasket under usual conditions with gas, water or other fluids, will tend to swell in actual use, thereby insuring a tight joint. Dehydrated gas coming in contact with the tip or small end of the gasket swells the rubber, while the moisture of the air or the soil tends to swell the fibrous material. Thus a tight joint is insured, with no possibility of leakage.

It will be apparent from the description that the improved gasket is composed of an inner member, the rubber, expanding under the action of dehydrated gas and wet gas, and an outer member, the fibrous material expanding under the action of moisture. Said materials are segregated into masses, and the masses are aggregated into a body or a single mass.

What is claimed as new is:—

1. A unitary gasket or packing in annular form and comprising a rubber body of substantially V-section having at its broader plane side an annular channel of substantial depth, and therein a filling of fibrous material, and an annular backing sheet overlying the fibrous material.

2. A unitary gasket or packing in annular form and comprising a rubber body of substantially V-section having at its broader plane side an annular channel of substantial depth, and therein a filling of fibrous material, and an annular sheet covering the fibrous material and adjacent free edges of the body.

3. A gasket for pipe joints of the gland packed type comprising an annular body of rubber having a substantially straight inner wall and a flaring outer wall, a pocket in said body bounded by said walls and opening at the wide end of the body and terminating within the body above the narrow end, said body having a tapered solid portion below said pocket, and a packing of fibrous material embedded in said pocket and extending above the top edges of said walls of the body, and a flexible sheet covering said fibrous material and the upper edges of said walls of the body.

JAMES W. MOORE.
VERNE C. FOSTER.